United States Patent

Markstein et al.

[11] Patent Number: 5,685,141
[45] Date of Patent: Nov. 11, 1997

[54] LOCK FOR NOZZLE CONTROL IN THE EVENT OF HYDRAULIC FAILURE

[75] Inventors: David J. Markstein, Hamilton; Paul B. Kemme, West Chester, both of Ohio

[73] Assignee: General Electric Company, Cincinnati, Ohio

[21] Appl. No.: 578,808

[22] Filed: Dec. 26, 1995

[51] Int. Cl.[6] .................................................. F02K 1/00
[52] U.S. Cl. .......................... 60/204; 60/271; 60/223; 239/265.19; 92/28; 92/19
[58] Field of Search .................. 60/39.091, 226.2, 60/271, 223, 204; 92/28, 19; 239/265.19, 265.39

[56] References Cited

U.S. PATENT DOCUMENTS

| | | |
|---|---|---|
| 2,657,539 | 11/1953 | Geyer . |
| 2,688,232 | 9/1954 | Geyer . |
| 2,819,589 | 1/1958 | Geyer . |
| 2,866,315 | 12/1958 | Schakel ............................ 60/39.091 |
| 2,886,008 | 5/1959 | Geyer ...................................... 92/24 |
| 3,024,771 | 3/1962 | Criffield et al. ..................... 60/271 |
| 3,227,048 | 1/1966 | Criffield et al. . |
| 3,296,936 | 1/1967 | Wess et al. . |
| 3,515,033 | 6/1970 | Geyer . |
| 3,621,763 | 11/1971 | Geyer ...................................... 92/17 |
| 3,730,436 | 5/1973 | Madden et al. .................. 239/265.39 |
| 3,767,120 | 10/1973 | Harmon ........................... 239/265.39 |
| 3,792,815 | 2/1974 | Swavely ........................... 239/265.39 |
| 4,181,260 | 1/1980 | Nash ................................ 239/265.39 |
| 4,383,647 | 5/1983 | Woodruff et al. .............. 239/265.19 |
| 4,760,964 | 8/1988 | Burandt .......................... 239/265.19 |
| 5,029,514 | 7/1991 | Pickard ................................ 60/271 |
| 5,174,502 | 12/1992 | Lippmeier et al. .............. 239/265.39 |
| 5,280,704 | 1/1994 | Anderson et al. .................. 60/226.2 |
| 5,448,884 | 9/1995 | Repp .................................... 60/223 |

*Primary Examiner*—Timothy Thorpe
*Assistant Examiner*—Ted Kim
*Attorney, Agent, or Firm*—Andrew C. Hess; Nathan D. Herkamp

[57] ABSTRACT

A method is provided for locking jet engine exhaust nozzle position in a hydraulic system having nozzle actuators connected by a synchronization cable. The synchronization cable engages with a conical brake locking mechanism to prevent cable rotation in the event of a hydraulic failure. The nozzle is locked in position at the time of the hydraulic failure. This prevents a significant decrease in usable thrust.

8 Claims, 5 Drawing Sheets

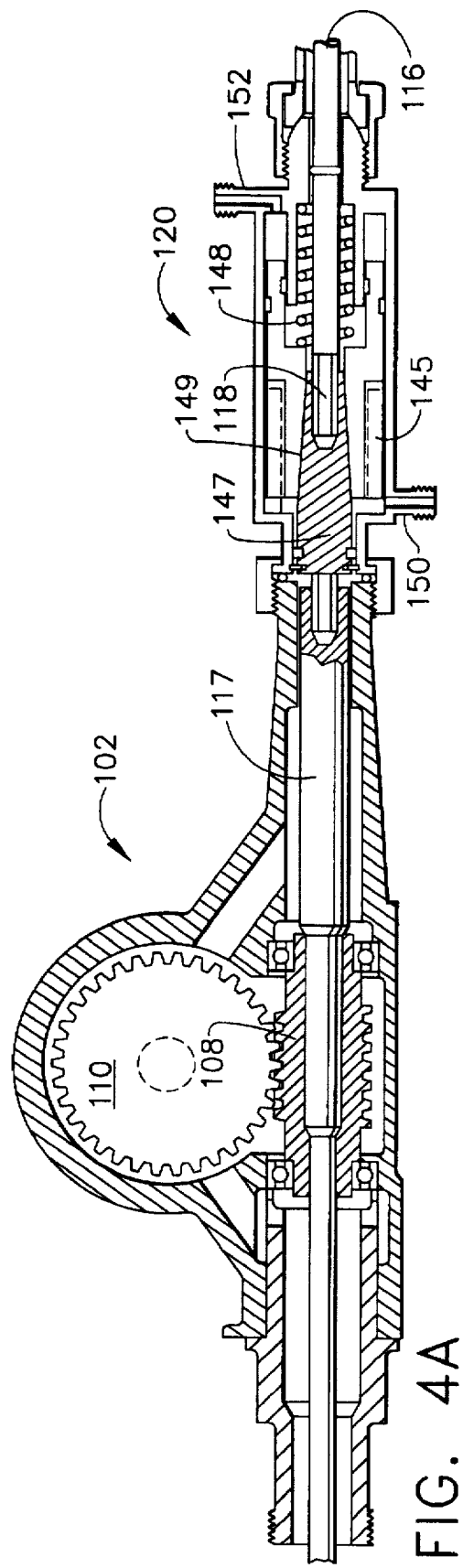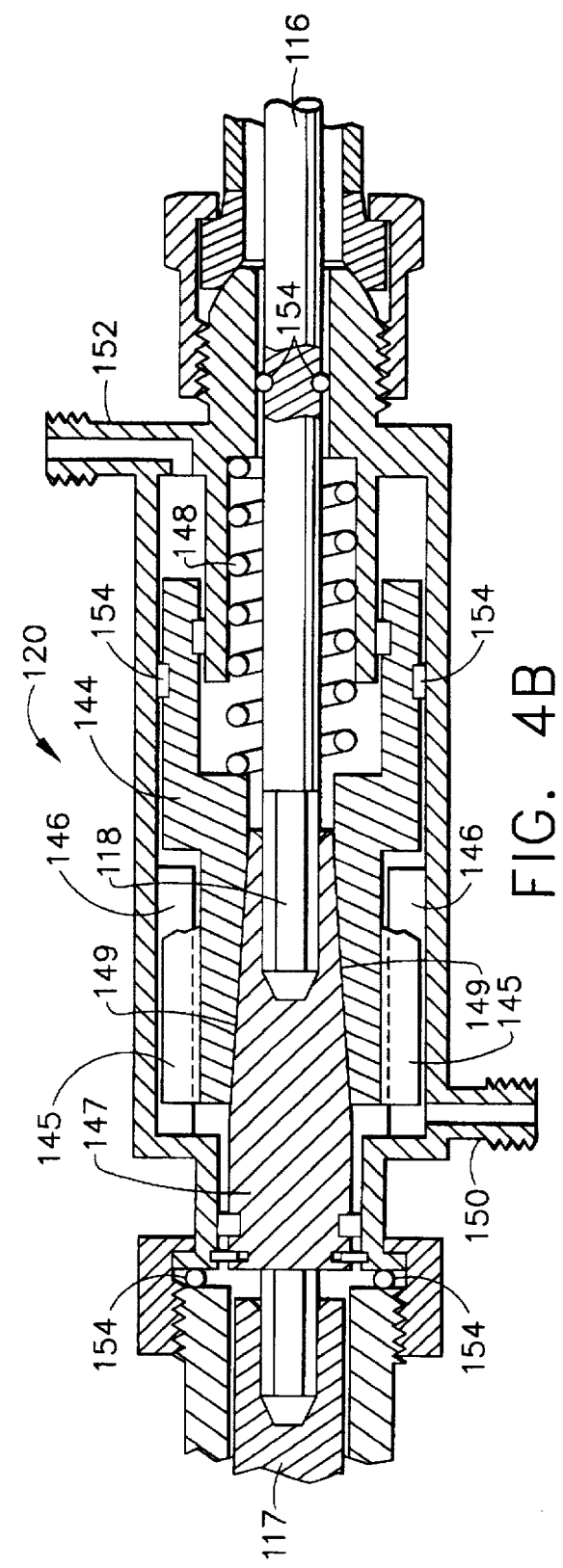

LOCK FOR NOZZLE CONTROL IN THE EVENT OF HYDRAULIC FAILURE

TECHNICAL FIELD

The present invention relates, in general to jet engine hydraulic systems and, more particularly, to a lock for exhaust nozzle control in the event of hydraulic failure in such a system.

BACKGROUND OF THE INVENTION

The General Electric F110, F101 and F404 engines use an oil operated nozzle hydraulic pump. The pump, all actuators, and all hydraulic lines are filled with engine lube oil at high pressure. Convergent/divergent nozzles have, in serial flow relationship, a convergent section, a throat, and a divergent section. The exhaust nozzles of such engines use convergent/divergent flaps with associated seals between the flaps to define the flow path of their respective sections. When converted to an axisymmetric vectoring nozzle, an actuation system is added to the divergent flaps of the nozzle to deflect the exhaust gas by any amount and in any desired direction from the engine counterline. The flaps and seals aerodynamically control the exhaust flow to transform the pressure and thermal energy of the engine exhaust discharge airflow into velocity and forward thrust for the engine.

Current A8 nozzle actuators are hydraulically driven and are connected by a synchronization cable. This cable will not permit individual actuators to move unless all four actuators move together.

It is therefore highly desirable and the fundamental object of the present invention to prevent the actuators from extending during a hydraulic failure.

Another object of the present invention is to provide a means of preventing thrust loss during hydraulic failure.

The present invention is particularly adaptable for use with a system having an axisymmetric vectoring exhaust nozzle (AVEN). The lock for the nozzle control would be used in the event of hydraulic failure, to ensure the availability of usable thrust.

These objects and other features and advantages will become more readily apparent in the following description when taken in conjunction with the appended drawings.

SUMMARY OF THE INVENTION

The present invention optimizes performance of nozzle hydraulics in the event of a hydraulic failure of an engine. In accordance with the present invention, the existing synchronization cable engages a conical brake which prevents cable rotation in the event of a hydraulic failure. This locks the A8 actuators, and therefore the nozzle, in its position at the time of failure. This prevents a significant decrease in usable thrust.

Briefly, in accordance with one aspect of the present invention, a method is provided for locking nozzle position in a hydraulic system having nozzle actuators connected by a synchronization cable. The method comprises the steps of engaging the synchronization cable with a conical brake locking mechanism; preventing cable rotation in the event of a hydraulic failure; locking the nozzle position when a hydraulic failure occurs; and preventing a significant decrease in usable thrust.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 4A illustrates the installed configuration of the present invention including an A8 actuator, synchronization cable, and lock mechanism;

FIG. 4B illustrates the installed configuration of the present invention in the engaged position including a lock mechanism housing, brake piston, conical brake spool, spring, and associated seals.

DETAILED DESCRIPTION OF THE INVENTION

Figure 1:
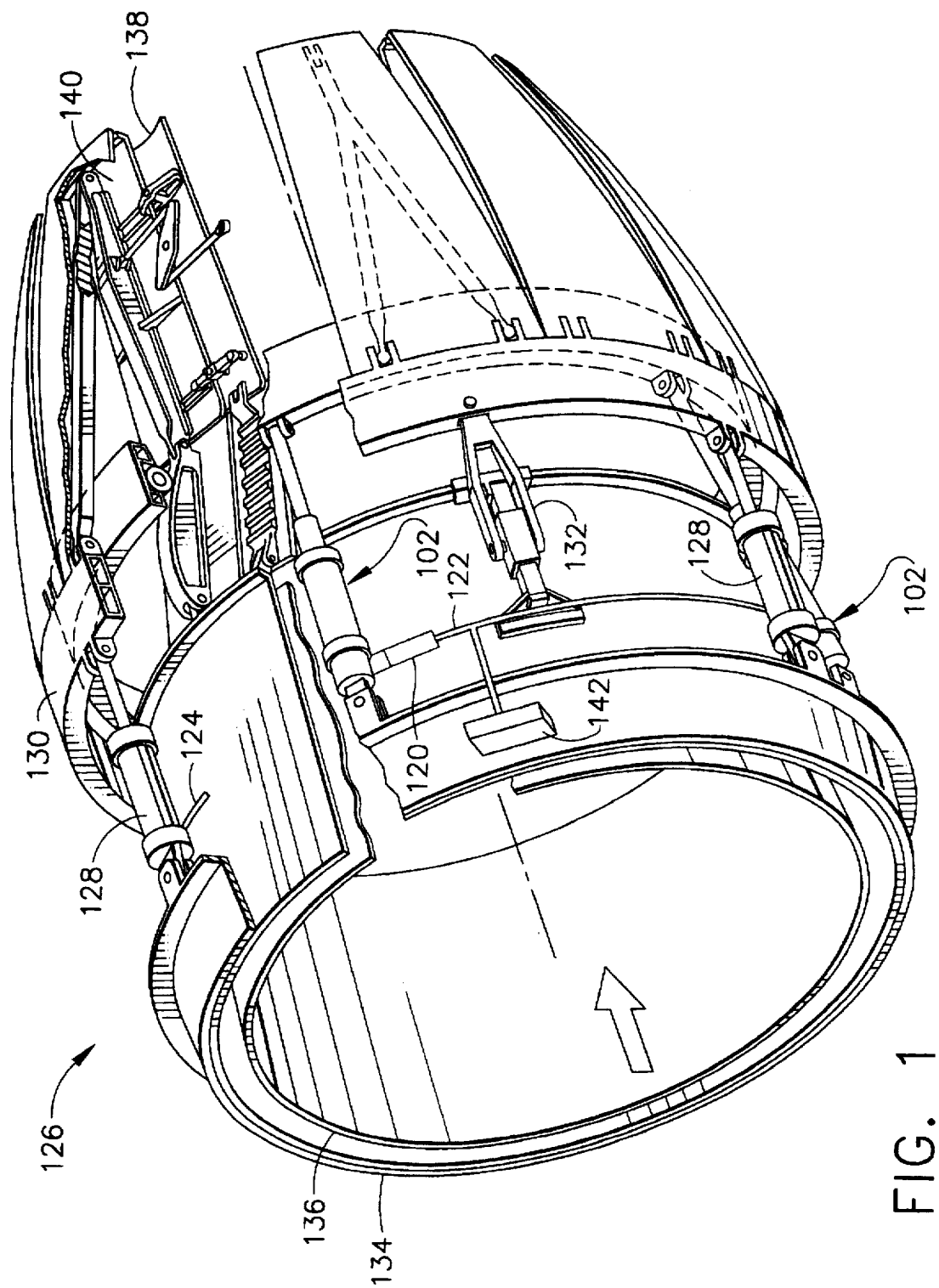
FIG. 1 illustrates a prior art AVEN nozzle assembly including a plurality of A8 synchronous actuators and head and rod manifolds.

Referring to the drawings, FIG. 1 not only illustrates a prior art AVEN exhaust nozzle system 126, but also illustrates a proposed location for lock mechanism 120 of the present invention. As shown, the lock mechanism 120 may be installed in head manifold 124 between a first actuator 102 and a section of tubing 122 which has been shortened to create space for the lock mechanism 120.

Figure 2:
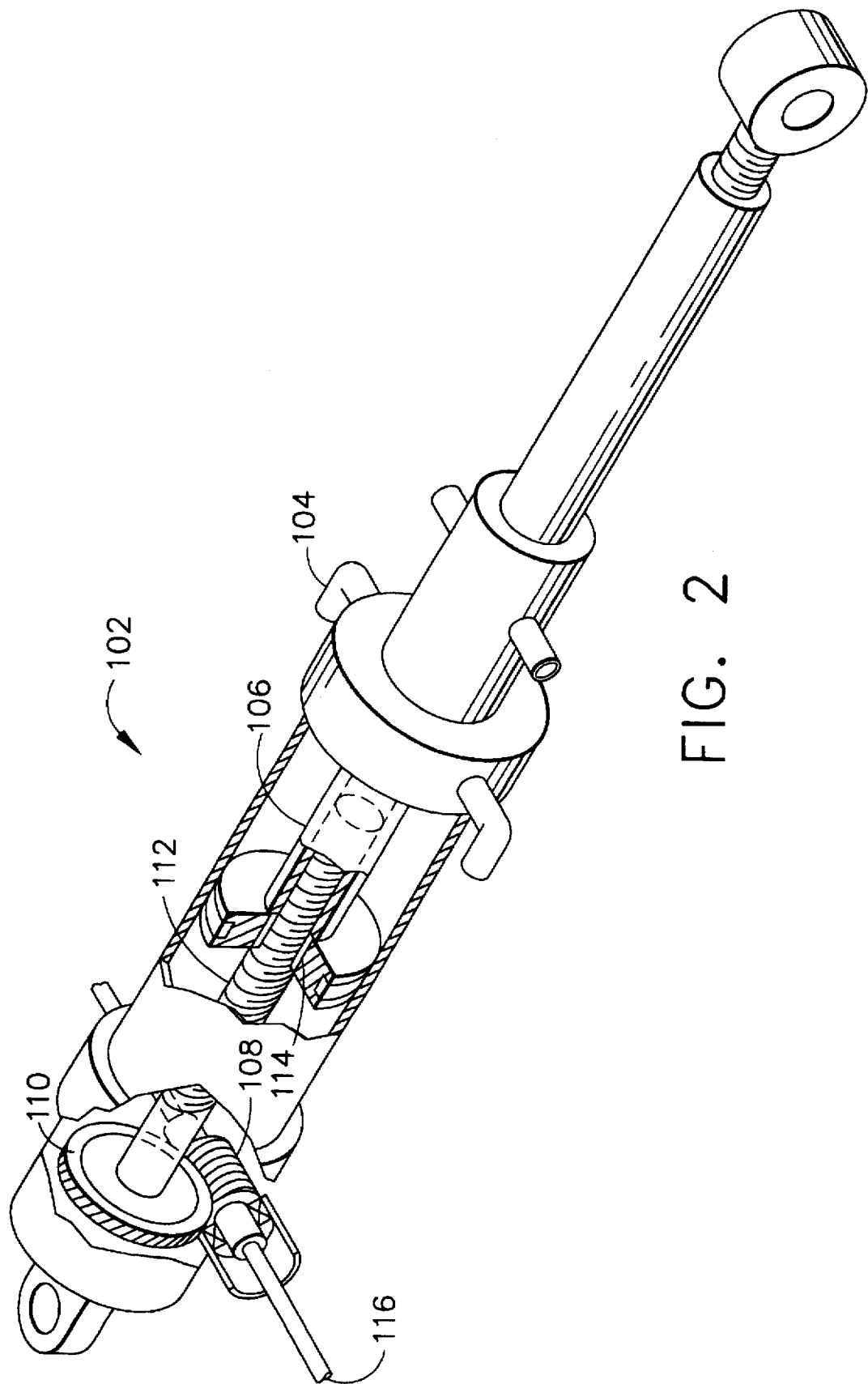
FIG. 2 is a prior art drawing of a single one of the plurality of A8 synchronous actuators of FIG. 1.

In FIG. 2 there is illustrated a prior art sectional view of a single one of the plurality of A8 synchronous actuators 102 of FIG. 1. The A8 synchronous actuator 102 is a hydraulic actuator. Fluid pressure is applied to the retract port (rod port) 104 to retract the piston of associated piston rod 106. The rod ends of the four A8 actuators 102 are connected to an exhaust nozzle such that retraction of the actuators 102 causes the convergent section of the nozzle to close. A hydraulic pump supplies pressure to the nozzle control valve 142 which in turn controls hydraulic flow and pressure to the A8 actuators 102, in FIG. 1.

The four actuators 102 each contain a synchronization mechanism which comprises worm 108, worm gear 110, acme screw 112 and acme nut 114, as shown in FIG. 2. The synchronization cable 116 of FIG. 4A comprises a lead fitting 118, three intermediate drive fittings (not shown), and an end fitting 117, shown in FIG. 4B, positioned on the synchronization cable such that they engage the worms 108 of the four actuators 102 when the cable 116 is installed. The lead fitting 118 is passed through the worm 108 of first actuator 102 in FIG. 1, then passes through head manifold 124 and subsequent actuators 102 until it emerges from the head manifold tubing at a first actuator 102 again. The lead fitting 118 then plugs into a socket in the end fitting 117, creating a synchronization cable which runs 360° around nozzle 126. The sections of the cable between the drive fittings runs in the head manifold piping between actuators.

As the actuator piston translates, the acme nut 114, which is fixed to the piston, causes the acme screw 112 to rotate about the axis of the actuator. The worm gear 110 is fixed to the acme screw 112, and therefore rotates with the acme screw 112. The worm gear 110 interacts with the worm 108, causing it and the engaged synchronization cable drive fitting to rotate about an axis perpendicular to the actuator axis. When all four actuators 102 translate in unison, the synchronization cable and fittings rotate with the worms in the actuators. If the distribution of load and/or pressure causes the hydraulic load applied to one actuator to be greater than the mechanical load on the piston applied by the A8 actuator ring, the one actuator will attempt to move beyond the position of the remaining three. The excess hydraulic load applies a torque through the actuator synchronization mechanism to the synchronization cable which is resisted by the remaining fittings engaged in the other actuators, thereby balancing the loads and synchronizing the motion of the actuators.

Because of the mechanical advantage of the synchronization mechanism, a relatively small amount of torque is required to stop the rotation of the cable to prevent all four actuators from moving. The lock mechanism of the present invention takes advantage of this characteristic of the synchronization system to lock the nozzle in position in the event of loss of hydraulic pressure.

Referring again to FIG. 1, the AVEN nozzle 126 is known in the art. The nozzle 126 comprises A8 actuator 102, A9 vectoring actuator 128, A9 vectoring ring 130, associated A9 ring centering support 132, duct 134, duct liner 136, divergent seals and flaps 138 and 140, and a nozzle control valve 142.

Figure 5:
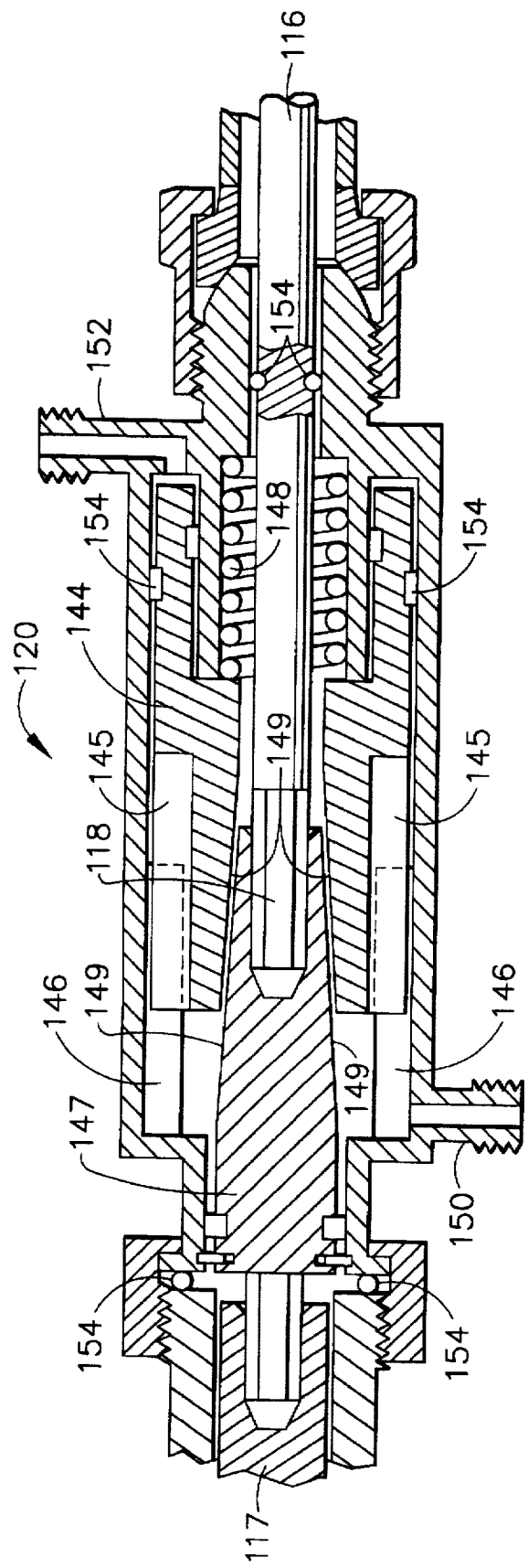
FIG. 5 illustrates the installed configuration of the present invention in the disengaged position including a lock mechanism housing, brake piston, conical brake spool, spring, and associated seals.

Referring now to FIGS. 4A and 4B, there are illustrated an A8 actuator 102, synchronization cable 116, and an installed configuration of the lock mechanism 120 in accordance with the present invention. FIG. 4B illustrates the lock mechanism 120 of the present invention in the engaged position. FIG. 5 illustrates the lock mechanism 120 of the present invention in the disengaged position. The lock mechanism 120 comprises a lock mechanism housing 145 with anti-rotation keys 146; rod pressure and drain ports 150 and 152, respectively; brake piston 144; spring 148; conical brake spool 147; and associated seals 154. The conical brake spool is interposed between the synchronization cable end fitting and lead fitting. The conical brake spool is engaged to both the lead and end fittings such that they rotate in unison. The brake piston includes a conical braking surface 149 which will engage a mating surface on the conical brake spool.

Rod side hydraulic pressure applied to the rod pressure port 150 overcomes the spring force to maintain the disengaged position of the brake piston, as shown in FIG. 5. In the event of a hydraulic failure, the spring force will cause the brake piston to translate to the left, which engages the conical braking surfaces of the piston and the spool as shown in FIG. 4B. The anti-rotation keys in the housing and on the brake piston prevent rotation of the brake piston and the engaged conical brake spool relative to the housing, thereby stopping rotation of the synchronization cable. Stopping the rotation of the synchronization cable will lock the A8 actuators in place due to the mechanical advantage afforded by the synchronization mechanism comprising worm 108, worm gear 110, acme screw 112, and acme nut 114. Locking the A8 actuators in place prevent the aerodynamic forces in the nozzle from opening the nozzle, which requires that the actuators extend, thereby preventing a significant decrease in usable thrust.

In a preferred embodiment of the present invention, spring 148 and the braking surfaces of the brake piston and the conical brake spool would be specified such that an operational hydraulic system could overcome a failed locking mechanism, i.e., inadvertently engaged, allowing the actuators and nozzle to function with degraded performance.

Figure 3:
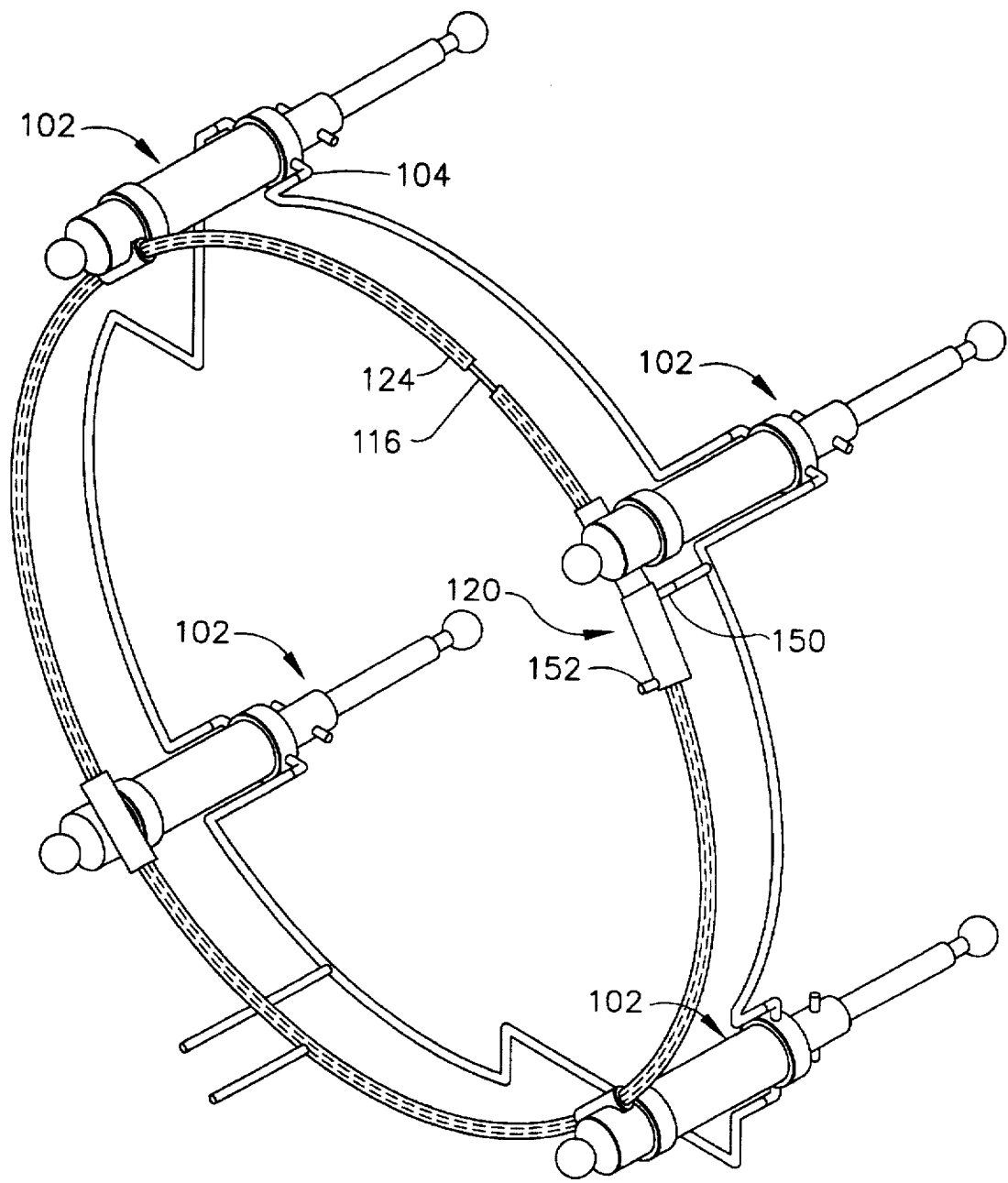
FIG. 3 is an AVEN A8 actuator system configured in accordance with the present invention.

The current nozzle actuation system, such as is illustrated in FIG. 3, is easily modified to accommodate the device, to allow incorporation in the A8 actuator head manifold tubing 124, according to the present invention. The present invention requires only a rod-side (retract) pressure connection at location 150 in FIG. 4A and a drain connection to ambient pressure at location 152 in FIG. 4A.

In accordance with one embodiment of the present invention, the modification to the current nozzle actuation system comprises the lock mechanism housing 145 illustrated in FIGS. 4A, 4B and 5; conical brake spool 147 shown in FIGS. 4B and 5; brake piston 144 shown in FIG. 4B and 5; spring 148 of FIGS. 4B and 5; associated seals 154 shown in FIGS. 4B and 5; and hydraulic supply and drain tubes, which would connect to the rod pressure and drain ports of the lock mechanism housing shown in Figs. 4A, 4B and 5. The lock mechanism housing replaces a short section of the A8 head manifold tubing 124, as illustrated in FIG. 3. Dimensional changes to the existing synchronization cable can be made to accommodate the length of the conical brake spool.

In an alternative embodiment, the device of the present invention could be designed to use available head-side pressure to provide the hydraulic force to overcome the spring force to disengage the brake piston from the conical brake spool. A hydraulic failure results in the loss of both rod-side and head-side pressure, which would cause the brake piston to engage the conical brake spool, stopping rotation of the synchronization cable, thereby locking the actuators and nozzle in a manner similar to the preferred embodiment described above.

In an additional alternative embodiment, the device of the present invention could be incorporated in the housing of one of the A8 actuators. The brake piston would incorporate a pawl which would directly engage the worm 108 in the event of hydraulic failure, preventing rotation of the worm. Preventing rotation of the worm in one actuator prevents rotation of the synchronization cable, thereby locking the actuators and nozzle in a manner similar to the preferred embodiment described above.

While preferred embodiments of the present invention have been shown and described herein, it will be obvious to those skilled in the art that such embodiments are provided by way of example only. Numerous variations, changes, and substitutions will now occur to those skilled in the art without departing from the invention. For example, the invention can be applied also to nozzles which use synchronized actuators, but are not hydraulically driven, without departing from the scope and content of the invention. The system of the present invention responds passively to system failure, instead of being commanded. Furthermore, its conical "clutch" is intended to slip if inadvertently engaged, and to lock only during a hydraulic failure. Additionally, the device relies on the A8 actuators' locking mechanism, which uses the synchronization cable as an input, instead of trying to lock the nozzle solely by the conical surface. Other alternatives, including hydraulic redundancy are also possible, although they may be impractical from a cost and weight standpoint, without departing from the scope and content of the invention. Accordingly, it is intended that the invention be limited only by the spirit and scope of the appended claims.

What is claimed is:

1. A method for locking nozzle position in a hydraulic system having a plurality of nozzle actuators connected by a synchronization cable comprises the steps of:

engaging the synchronization cable with a conical brake locking mechanism;

preventing rotation of the synchronization cable during a hydraulic failure;

locking the nozzle in position when a hydraulic failure occurs; and preventing a significant decrease in usable thrust.

2. A method for locking nozzle position in a hydraulic system as claimed in claim 1 further comprising the step of preventing the actuators from extending during a hydraulic failure.

3. A method for locking nozzle position in a hydraulic system as claimed in claim 1 further comprising the step of providing a rod-side pressure connection.

4. A method for locking nozzle position in a hydraulic system as claimed in claim 1 further comprising the step of providing a drain connection to ambient pressure.

5. A method for locking nozzle position in a hydraulic system as claimed in claim 1 further comprising the step of allowing the actuators to function with degraded performance in the event of a lock mechanism failure.

6. A method for locking nozzle position in a hydraulic system as claimed in claim 1 wherein the step of preventing rotation of the synchronization cable during a hydraulic failure further comprises the step of providing a brake piston.

7. A method for locking nozzle position in a hydraulic system as claimed in claim 6 further comprising the step of using head-side pressure to disengage the brake piston.

8. A method for locking nozzle position in a hydraulic system as claimed in claim 6 further comprising the step of incorporating the brake piston in one of the plurality of actuators to prevent rotation of the synchronization cable.

* * * * *